(No Model.)  2 Sheets—Sheet 1.
H. C. KEELER.
PENDULUM SCALE.
No. 297,267. Patented Apr. 22, 1884.
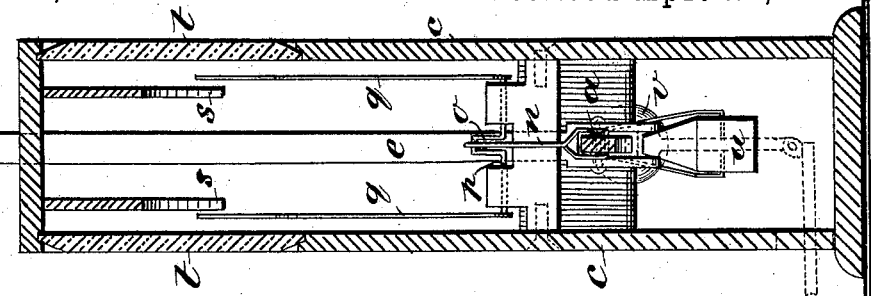
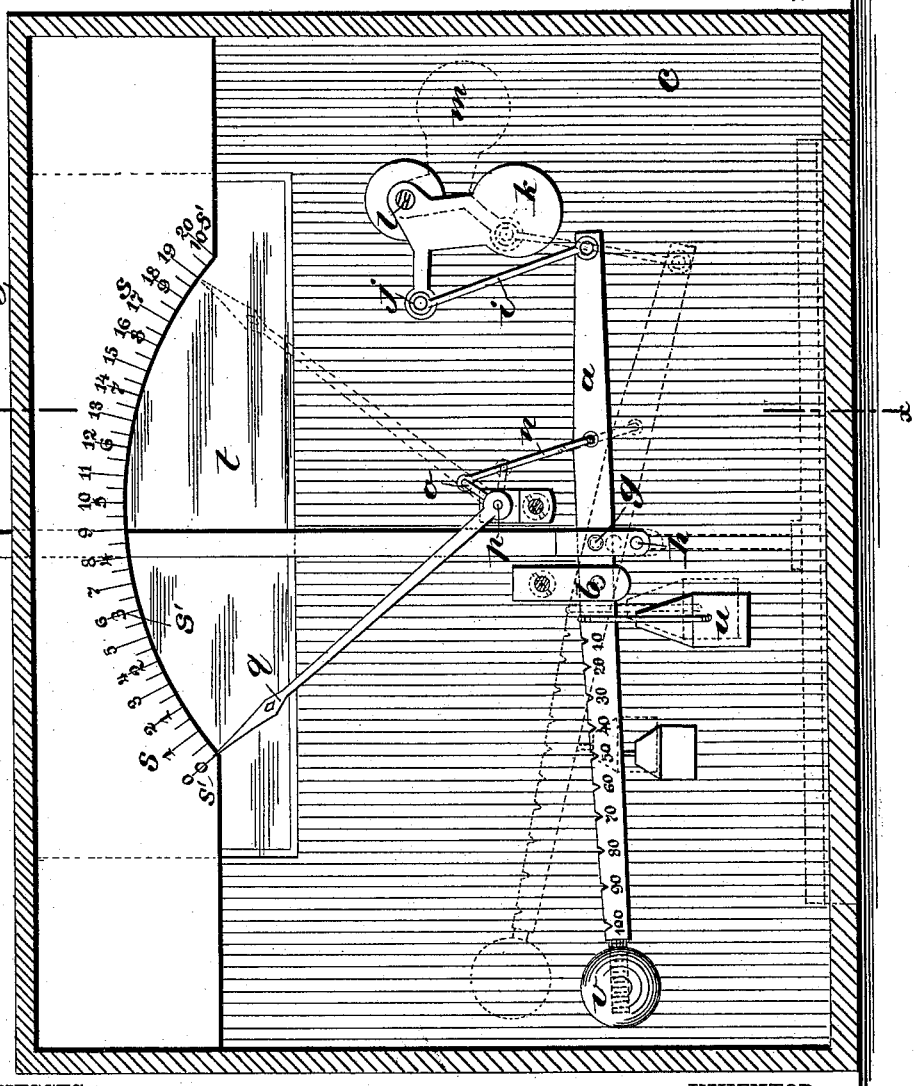
WITNESSES:
Otto Berger
B. G. Underwood.
INVENTOR:
H. C. Keeler.
BY Munn & Co.
ATTORNEYS.

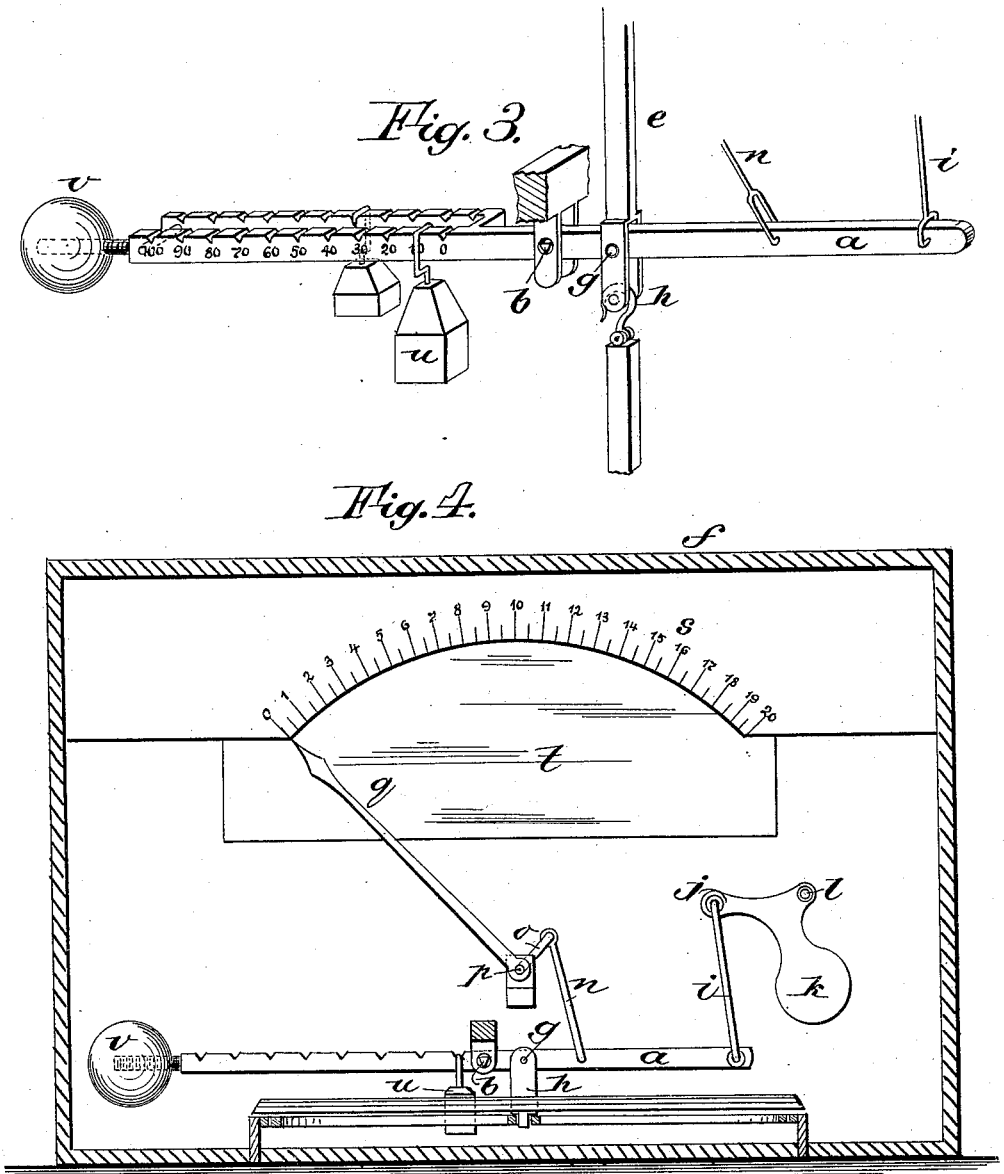

UNITED STATES PATENT OFFICE.

HENRY CLAY KEELER, OF OGDEN, UTAH TERRITORY.

PENDULUM-SCALE.

SPECIFICATION forming part of Letters Patent No. 297,267, dated April 22, 1884.

Application filed August 2, 1883. (No model.)

*To all whom it may concern:*

Be it known that I, HENRY C. KEELER, of Ogden, in the county of Weber and Territory of Utah, have invented a new and Improved Weighing-Scale, of which the following is a full, clear, and exact description.

My invention consists in the construction and combination of parts forming weighing-scales, hereinafter described and claimed.

Reference is to be had to the accompanying drawings, forming a part of this specification, in which similar letters of reference indicate corresponding parts in all the figures.

Figure 1 is a sectional elevation of the inclosing-case for the scale mechanism and supporting-base for the scoop, showing the mechanism in side elevation. Fig. 2 is a transverse section of the said scale on the line $x\,x$ of Fig. 1. Fig. 3 is a detail in perspective view, showing a double beam to be used when both the scoop and platform are employed in one scale. Fig. 4 is a sectional elevation of the scale as arranged with a platform without the scoop.

The beam $a$ is pivoted to a supporting-bracket, at $b$, in the lower portion of a suitable inclosing-case, $c$, for the scale mechanism and for a base to the scoop $d$, which is mounted on the top of a vertical bar, $e$, extending down through the top $f$ of the case to the scale-beam $a$, whereon it is pivoted at $g$, and from which it extends below the beam a short distance to support a pin at $h$, for the connection of a hook by which to connect the lever of a platform-scale. From the pivot $g$ the beam $a$ has an extension of a suitable length, the end of which is connected by a rod, $i$, with the end of a horizontal arm, $j$, of a pendulum-weight, $k$, which is suspended from the pivot $l$ suitably for weighing the smaller quantities for which the scoop is used by swinging around said pivot, as indicated by the dotted lines $m$. Between fulcrum $b$ and the end of the beam to which the said pendulum-weight $k$ is connected said beam is connected by rod $n$ with the arm $o$ of a shaft, $p$, that carries a couple of pointers, $q$, which range along a couple of dials, $s$, that face in opposite directions, in order that the weight may be read off from either side of the scale through glass panels $t$ in the sides of the case. A multiplying-weight, $u$, is suspended from the beam $a$, suitably for use when heavier weights are to be weighed in the scoop or on a platform to be connected with the bar $e$, and a balancing ball, $v$, is suitably fixed on the end of the scale-beam for shifting along it as may be required for adjusting from time to time as the temperature changes, said ball being fixed to screw along the beam. This ball and the weight $u$ are to balance the beam when said weight $u$ stands in the zero-notch. The weight $k$ hangs directly downward when the index $q$ is at $o$ of the scale. The downward movement of arm $a$ of the beam is limited by rod $i$ when it almost coincides with a radius through $l\,j$. By this movement the weight $k$ is swung through an arc of about sixty degrees, and a pointer, if attached to the axis $l$ thereof, would indicate the same angle of motion. I find that such registry is not accurate, but indicates sometimes more and sometimes less than the actual weight, according to the relative positions of arms $a$ and $j$. I therefore provide an independently-journaled index-arm, $q$, as described. This arm is so connected to the beam $a$ that it moves through a different angle from the weight $k$, and the relation of its crank $o$ to the line of its connecting-rod is at all times different from the relation of crank or arm $j$ to connecting-rod $i$.

I may, if preferred, substitute pendulums with removable weights for the balancing ball and the weight $u$. In case a very wide range of variation is required between the scoop-weights and the platform-weights when a platform is connected with the scale, I may use a double beam, $a$, and double weights $u$.

In practice I will have the usual knife-edge pivots in all cases, except the pivots of the pointer-shaft $p$, which must have close-fitting bearings and caps for accuracy.

For the platform-scale only the scoop-supporting bar $e$ will not be used nor extended above the weigh-beam, and when both the scoop and platform are used together with a double beam, as commonly used with scoop and platform scales, (see Fig. 3,) there must be another dial, $s'$, in connection with this pointer device for the platform. In this arrangement one of the beams and dials will be graduated for the scoop and the other beam and dial for the platform.

Having thus described my invention, I claim as new and desire to secure by Letters Patent—

1. The combination, in a weighing-scale, of the weigh-beam $a$, having the multiplying-weight $u$, balance-weight $v$, and pendulum-weight $k$, and the supporting-bar $e$, having the scoop $d$, and the platform-lever connecting extension $h$, substantially as described.

2. In a weighing-scale having the pointer $q$, for recording the weights on a dial, the said dial having separate dial-scales for the scoop and platform, in combination with a double weigh-beam, substantially as described.

3. The weigh-beam $a$, journaled in the main frame, the weight $k$, journaled in the frame at $l$, and provided with arm $j$, and the rod $i$, connecting-arms $a$ and $j$, in combination with the index or pointer $q$, independently journaled in the frame, and provided with the crank-arm $o$ and the rod $w$, connecting arm $o$ with arm $a$, as and for the purpose specified.

HENRY CLAY KEELER.

Witnesses:
CALEB A. THOMPSON,
FREDERICK A. SHIELLS.